Aug. 23, 1932.   P. A. GOLDFISCH   1,872,730
ELECTRIC HEATER
Filed Aug. 31, 1929
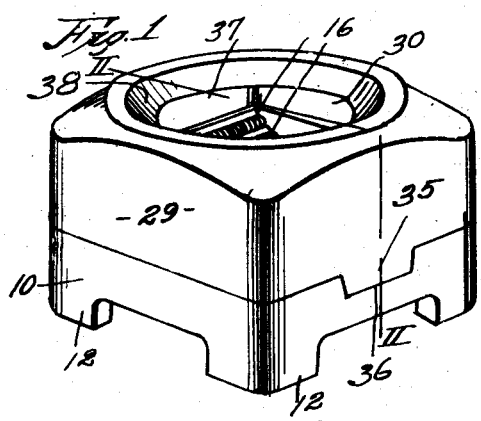
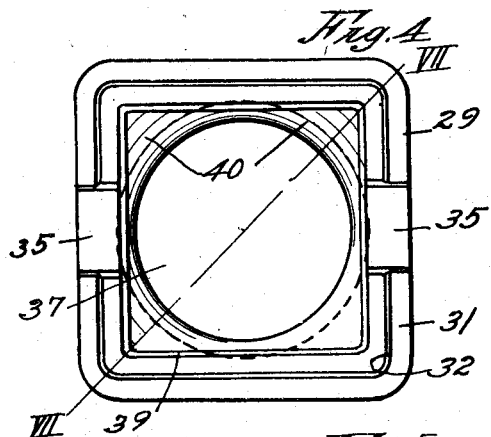
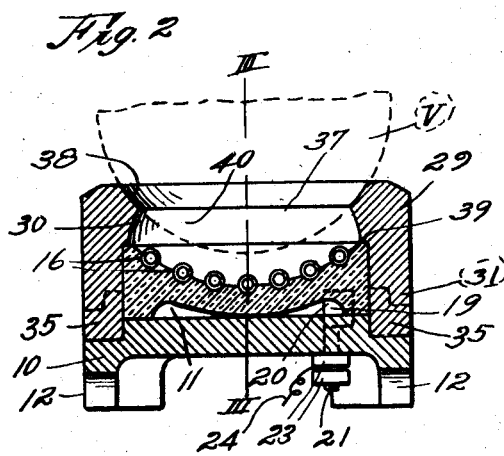
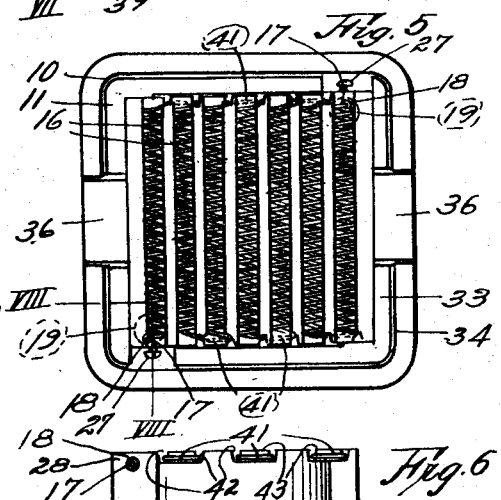
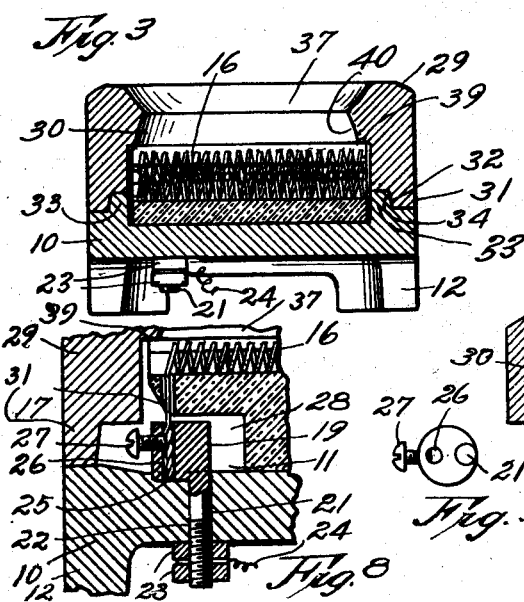
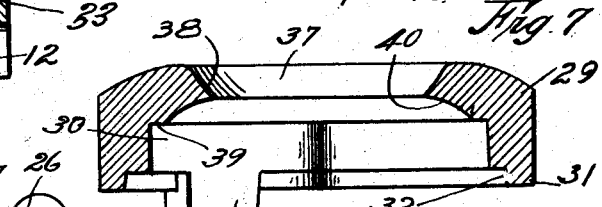
INVENTOR
Philip A. Goldfisch
BY Roy E. Hamilton
ATTORNEY Patented Aug. 23, 1932

1,872,730

UNITED STATES PATENT OFFICE

PHILIP A. GOLDFISCH, OF KANSAS CITY, MISSOURI, ASSIGNOR TO LABORATORY CONSTRUCTION COMPANY, OF KANSAS CITY, MISSOURI, A CORPORATION OF MISSOURI

ELECTRIC HEATER

Application filed August 31, 1929. Serial No. 389,685.

This invention relates to electric heaters and particularly to that type of device adapted for heating spherical flasks used in distillation.

The principal object of this invention is the provision of an electric heater having a series of elongated resistance coils disposed in right arcuate concave position.

A further object of the present invention is the provision of a specially constructed casing made of a plurality of members novelly positioned together and having walls formed to deflect heat from the heat unit toward a common central area.

Another object of the present invention is the provision of an electric heater having new and novel heating element and heating element connections.

A still further object of this invention resides in providing a device which is simple and durable in construction, inexpensive to manufacture and one which will be extremely efficient and useful in operation.

With these general objects in view as well as minor objects which will appear during the course of the detailed specification, reference will now be had to the accompanying drawing in which:

Figure 1 is a perspective view of an electric heater embodying this invention;

Fig. 2 is a vertical cross section taken on line II—II of Fig. 1;

Fig. 3 is a vertical cross section taken on line III—III of Fig. 2;

Fig. 4 is an inverted plan view of the top member of the casing;

Fig. 5 is a plan view of the heater with the top member of the casing removed;

Fig. 6 is an inverted plan of the body of refractory material;

Fig. 7 is a diagonal cross section taken on line VII—VII of Fig. 4;

Fig. 8 is an enlarged fragmentary sectional view taken on line VIII—VIII of Fig. 5;

Fig. 9 is an enlarged inverted plan view of the terminal post.

Like reference characters designate similar parts throughout the several views and the numeral 10 designates a rectangular base member made of any suitable heat resisting material and having a recess 11 formed in the upper surface thereof. Said base member is provided at its corners with suitable legs 12 by means of which the main body of the base member is supported above the supporting surface.

Positioned in recess 11 of base 10 is a body 13 of refractory material having a concave right circular surface 14 which is provided with a series of similar, parallel, longitudinal grooves 15 adapted to receive the electric heating coils 16 in such a manner that their outer surfaces are in a surface concentric with said right circular surface 14. The lower surface of body 13 is recessed in such a manner that said refractory body is substantially of equal thickness throughout its entire area thus lessening the chance of fracture due to unequal expansion and contraction.

Referring to Fig. 5, it will be noted that the series of electric heating coils 16 are positioned with their opposite ends uniformly equidistant from the ends of body 13 with opposite ends, respectively, of the outer coils provided with a terminal wire 17 which extends through vertical opening 18 formed in body 13. The coils 16 are formed in series by a connecting loop 41 between each of said coils and connecting successive coils in series, which passes through end slots 42 formed in body 13 and around a boss 43 formed thereon, thus the end of each coil is securely anchored to base 13 to hold the coil securely in their respective grooves.

Positioned below each of the holes 18 and securely mounted in base member 10 is a binding post 19 having a cylindrical head 20 and a downwardly projecting threaded stem 21 which extends through an opening 21 formed in base 10 and is provided with binding nuts 23 by means of which it is held in position. Nuts 23 also serves to bind the feed wire 24 in electrical contact with the binding post.

Referring to Fig. 8, it will be noted that the lower portion of head 20 is positioned in a recess 25 formed in base 10 in such a manner that the securing stem 21 is positioned at the inner surface of the head 20 thereby positioning said stem and the nuts a sufficient distance away from the inner walls of legs 12 to allow room for adjustment. When the terminal 19 is thus positioned it will be secured against relative movement with said base and the hole 26 extending through head 20 adjacent its outer edge will be in register with one of the holes 18 thus allowing the insertion of terminal wires 17 therein.

When the terminal wire is positioned in hole 26 a set screw 27 is tightened thereagainst, thus making a good electrical contact with said post. Posts 19 are positioned beneath refractory body 13 and extend into recesses 28 respectively which are formed in the under side of body 13 thereby protecting said terminal from excessive heat. In order to obtain a better contact, terminal wire 17 is preferably folded back on itself and twisted. This however, might be accomplished by dipping the end of said wire in some suitable conducting material to increase its diameter.

In order to permit easy access to screws 27 when the top casing member 29 is removed a portion of the flange 31 is cut away at 44, which normally would extend above said screw.

Coextensive with base member 10 and positioned thereon is a top casing member 29 having a recess 30 formed in its under side adapted to receive the upper portion of the refractory body member 13 which extends above base 10. In order to retain the two casing members 10 and 29 in proper relative position, a downturned flange 31 having a downwardly and outwardly converging wall 32 is adapted to overhang the upwardly extending flange 33 of base member 10 which has an upwardly and inwardly extending outer wall 34. Also, downwardly extending lips 35 carried by top 29 are adapted to fit in recesses 36 formed in base 10. The walls of said lips and recesses are so formed as to readily guide the top member to its proper position. For supporting a vessel containing the substance to be heated adjacent the heating elements a circular opening 37 is provided in the top portion of member 29. The side wall 38 of opening 37 is the zone of a sphere generated from a center positioned on the axis of the right circular surface 14 and in a plane perpendicular to said axis which intersects said surface 14 adjacent its central portion. Referring to Fig. 2, in which the vessel V is shown in dotted lines it will be noted that the portion of the vessel adjacent the electric heating coils 16 is concentric therewith thus heating a large area of said vessel to substantially uniform degree. The top member 29 is provided with a shoulder 39 which when said top member is in position, rests on top of body member 13 thus holding it in fixed position in the casing. The side wall 40 of opening 37 intermediate zone 38 and the body 13 is upwardly and inwardly converging thus directing the heat from the heating coils toward a common center.

I do not wish to limit this invention to the structure shown and described as many modifications may be made within the scope of the appended claim without departing from the spirit thereof.

What I claim is:

An electric heater for spherical flasks comprising interlocking casing members; a body of refractory material within the casing, having a right arcuate concave face; a series of parallel resistance coils carried by said concave face; a circular opening formed by one of said casing members above said series of coils; a flask-supporting surface of arcuate cross section at the margin around said opening, the said arc being generated from a center positioned on the axis of the said right arcuate concave face of said body of refractory material and in a plane perpendicular to said axis intersecting said surface at its center; an annular wall joining said flask-supporting surface at the opening edge, said wall overhanging said resistance coils and having a converging annular face whereby to direct heat from the said coils toward the said circular opening; a binding post extending through one of said casing members and terminating below the body of refractory material; a hole through said binding post; a bale through said body of refractory material in axial alinement with the hole through the binding post; and a terminal wire extending from one of said coils through the hole in the body of refractory material and into the hole of said binding post.

In testimony whereof, I hereunto affix my signature.

PHILIP A. GOLDFISCH.